US008882465B2

(12) United States Patent
Lane et al.

(10) Patent No.: US 8,882,465 B2
(45) Date of Patent: Nov. 11, 2014

(54) DUAL-MODE WIND MACHINE (75) Inventors: Annette Lane, Morgan Hill, CA (US);
Steve Lane, Morgan Hill, CA (US);
Marcus Byrd, Saratoga, CA (US);
Aaron Roth, San Jose, CA (US); Derek Snyder, San Jose, CA (US)

(73) Assignees: Annette Lane, San Jose, CA (US); Steve Lane, San Jose, CA (US); Marcus Byrd, San Jose, CA (US); Aaron Roth, San Jose, CA (US); Derek Snyder, San Jose, CA (US); Valley Christian Schools, San Jose, CA (US)

( * ) Notice: Subject to any disclaimer, the term of this patent is extended or adjusted under 35 U.S.C. 154(b) by 804 days.

(21) Appl. No.: 12/636,733

(22) Filed: Dec. 12, 2009

(65) Prior Publication Data

US 2010/0239411 A1 Sep. 23, 2010

Related U.S. Application Data (60) Provisional application No. 61/122,225, filed on Dec. 12, 2008.

(51) Int. Cl.
*F01D 7/00* (2006.01)
*F03D 9/00* (2006.01)
*F04D 27/00* (2006.01)

(52) U.S. Cl.
CPC .............. *F04D 27/004* (2013.01); *Y02E 10/72* (2013.01); *F03D 9/00* (2013.01); *Y10S 415/91* (2013.01)
USPC ........................ 416/146 R; 416/148; 415/910

(58) Field of Classification Search
CPC ......... F03D 1/001; F03D 1/003; F03D 7/042; F03D 7/0204; F03D 9/002; F04D 15/0066; F04D 27/007; F04D 19/002; F04D 25/024; F04D 25/105
USPC .............................. 415/910; 416/148, 146 R
See application file for complete search history.

(56) References Cited

U.S. PATENT DOCUMENTS

| | | | | |
|---|---|---|---|---|
| 1,993,635 A | * | 3/1935 | Towt | 47/2 |
| 2,231,454 A | * | 2/1941 | Saxe | 47/2 |
| 3,288,358 A | * | 11/1966 | Coles | 416/110 |
| 4,045,147 A | * | 8/1977 | Curp | 416/100 |
| 4,700,081 A | * | 10/1987 | Kos et al. | 290/44 |
| 2006/0159550 A1 | * | 7/2006 | Nagao | 416/132 B |

FOREIGN PATENT DOCUMENTS

| | | | |
|---|---|---|---|
| CA | 2353913 A1 | * | 1/2003 |
| DE | 2949447 B | * | 10/1980 |

* cited by examiner

*Primary Examiner* — Edward Look
*Assistant Examiner* — Adam W Brown
(74) *Attorney, Agent, or Firm* — Schwegman Lundberg & Woessner, P.A.

(57) ABSTRACT

A hybrid wind machine includes a fan shaft to drive a fan, and an electrical motor/generator combination, coupled to the first shaft, so as to allow the electrical motor/generator to drive the fan shaft when the wind machine is operating in a wind generating mode. Further, the coupling of the electrical motor/generator combination to the fan shaft allows the fan shaft to drive the electrical motor/generator combination as an electrical generator when the wind machine is operating in a power generating mode.

10 Claims, 8 Drawing Sheets

DUAL-MODE WIND MACHINE

CLAIM OF PRIORITY

The present patent application claims the priority benefit of the filing date of U.S. provisional application No. 61/122,225 filed Dec. 12, 2008, the entire content of which is incorporated herein by reference.

BACKGROUND

Frost control in agricultural lands (e.g., orchards, vineyards etc.) is an important strategy for crop loss reduction. For example, where grapes, buds or vines within a vineyard die of frost, the income losses to an agricultural operation may be substantial, and accompanied by agricultural job losses. Frost control is particularly important in areas which are intensively cultivated, such as the California region of the United States of America. California accounts for one quarter of the food production for the USA, and half of its fruit and vegetables. Considering wine grapes solely in the Sonoma, Napa, Lake and Mendocino counties, even a 10% loss of production would cause losses of more than $80 million. Further, in California, it is estimated that in December 1990 alone, frost caused approximately $500 million in fruit loss and damages to about 450,000 hectares of tress.

A number of methods and technologies are used to provide frost protection in agricultural lands. One such method is to use sprinklers to water the plants and agricultural land during frost. The formation of ice is accompanied by the release of large amounts of heat, which maintains plants at freezing temperature as long as the water is being frozen. The continuous sprinkling of plants during frosty nights has been used to protect plants from frost injury. However, sprinklers consume large amounts of water, and the amount of water applied in the frost protection measures is hard to control.

Another method is to employ orchard heaters. Heaters, however, tend to pollute, are expensive and a relatively large number are needed to cover any significant area (e.g., about one every 100 feet). Hot houses may also be used to protect crops, but are very expensive, difficult to install and uninstall, and are very labor intensive. Helicopters have also been used to push warm air from above the inversion layer downwards, so as to counter frost. Helicopters are needless to say expensive to operate, noisy, consume gas and the application of this method may be time-consuming.

Wind machines are the most widely deployed method of frost protection (e.g., 70%-80% of Washington growers use wind machines), and provide relatively economical frost protection. Wind machines operate by employing a fan that mixes air within and above an orchard, field or vineyard so that the average temperature near the ground is raised.

BRIEF DESCRIPTION OF DRAWINGS

Some embodiments are illustrated by way of example and not limitation in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

According to various example embodiments, there is provided a dual-mode (e.g., hybrid) wind machine having a first shaft to drive a fan of the wind machine, second shaft to be driven by an engine, and the third shaft to drive an electrical generator. A clutch mechanism (or other drive transmission, such as a gearbox, manual transmission, non-synchronous transmission, automatic transmission or semi-automatic transmission) is coupled between the first, second and third shafts so as to allow the second shaft (driven by the engine) to drive the first shaft when the hybrid wind machine is operating in a wind generating mode. Further, the clutch mechanism allows the first shaft to drive the third shaft when the hybrid wind machine is operating in a power generating mode.

An example embodiment may also include a mode selection mechanism, coupled to the clutch or transmission mechanism, so as to allow an operator or an automated mode selector to selectively engage the first and second shafts when the hybrid wind machine is operating in the wind generating mode, and to selectively engage the first and third shafts when the hybrid wind machine is operating in the power generating mode.

The hybrid wind machine may also include a wind monitoring system to selectively place the hybrid wind machine in the power generating mode based on detected wind conditions surrounding, or relative to, the hybrid wind machine.

An example embodiment may also include a control system so as to orientate the fan of the hybrid wind machine, based on a determined direction of the wind relative to the hybrid wind machine.

According to a further example embodiment, there is provided a wind machine having a shaft to drive a fan of the wind machine, and an electrical motor/generator coupled to the shaft, so as to allow the electrical motor/generator to drive the first shaft of the wind machine when the wind machine is operating in a wind generating mode, and so as to allow the first shaft to drive the electrical motor/generator (as an electrical generator) when the wind machine is operating in a power generating mode.

According to an example embodiment, there is also provided a retrofitted wind machine having a fan shaft to drive, and be driven by, a fan of the wind machine, a second shaft to drive an electrical generator, and a clutch (or other transmission means) coupled between the first shaft and the second shaft so as to allow the first shaft selectively to drive the second shaft when the wind machine is operating in a power generating mode.

Various example embodiments may also include a blade, fan, or fan head assembly that is movable between a first position in which the blades of the fan are inclined at a determinable angle relative to vertical, and the second position in which the blades of the fan are substantially planar with a vertical. In one example embodiment, the fan head may be a contouring head. Example embodiments also pertain to a method of retrofitting a wind machine, and various example methods of manufacturing dual-mode, hybrid or reversible wind machines as described in further detail below.

Figure 1:
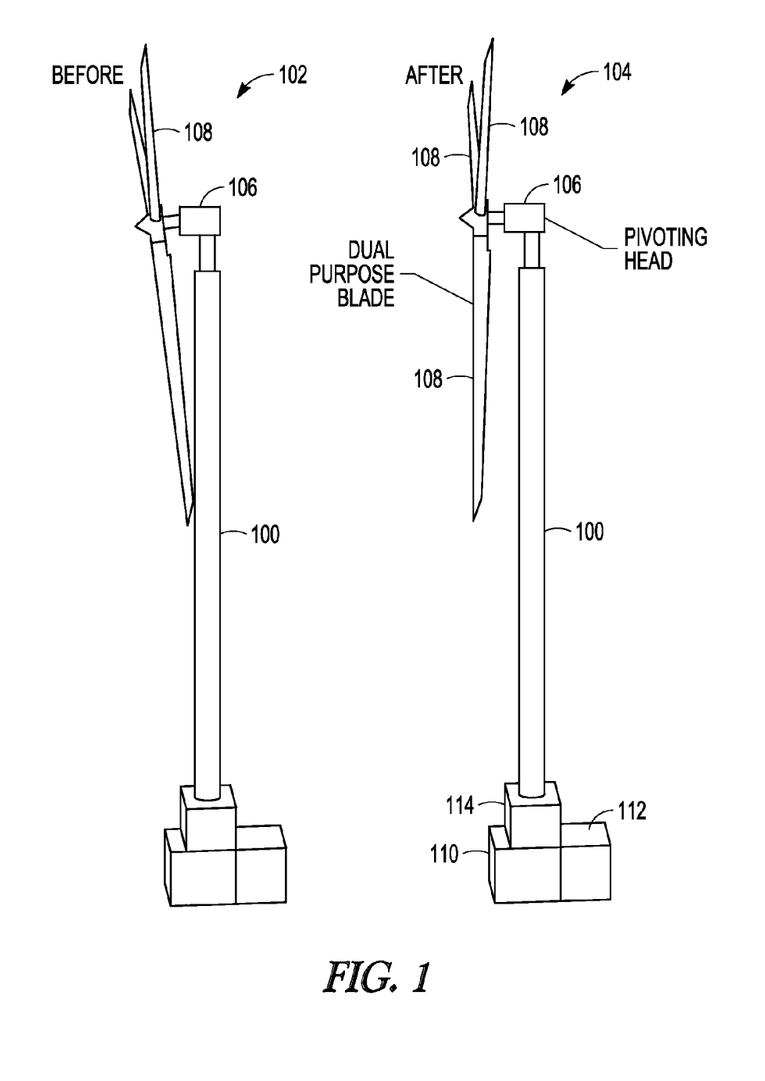
FIG. 1 is a diagrammatic depiction of a dual-mode (or reversible) wind machine, according to an example embodiment, having both an articulating or pivoting head and having a selectively engageable engine/motor and generator arrangement.

FIG. 1 provides pictorial representations of a dual-mode or hybrid wind machine 100 operating in a first wind generating mode 102 and in a second power generating mode 104. As shown in FIG. 1, the wind machine 100, in one example embodiment, has a pivoting head 106 so as to allow the blades 108 of a fan assembly to be pivoted between a first, substantially vertical position when the wind machine is operating in the power generating mode 104, and a second, inclined position when the wind machine 100 is operating in the wind generating mode 102 (e.g., a blowing mode). The fan of the wind machine 100 is shown to include three blades 108).

In one example embodiment, the blades 108 of the fan assembly may be dual-purposes blades that are used in both the power generating mode 104 and a wind generating mode 102. In another example embodiment, special-purpose blades (e.g., as part of a special-purpose head arrangement) may be used for each of the wind generating and power generating modes 102 and 104. In one such example embodiment, the special-purpose blades may be removably coupled to (or mountable on) a pivoting head 106, and be changed-out (e.g., on a quarterly or seasonal basis) depending upon desired usage of the wind machine 100. Alternatively, special-purpose pivoting head/blade assemblies may be provided for each of the wind and power generating modes 102 and 104. These special-purpose pivoting head/blade assemblies may be interchangeably mounted to the wind machine 100, depending on desired usage and operating mode.

The blades 108 may also be variable pitch blades. In such example embodiments, the pivoting head 106 may incorporate a pitch positioning mechanism that allows that the pitch of the blades 108 to be changed and optimized in each of the wind and power generating modes 102 and 104. As will be described in further detail below, the pitch positioning mechanism may be operable manually or automatically (e.g., under the control of a computer system executing software) to select a pitch for the blades 108 optimized for conditions and operating mode. When operating in the wind generating mode 102, the fan blades 108 are rotated so as to draw down warmer air (e.g., from an inversion layer above crops) and to blow down and mix the warmer air with cooler air at lower altitude so as to prevent stratification. In this way, the risk of frost damage to the crop can be reduced. Further, when operating in the wind generating mode 102, the head 106 of the wind machine 106 may rotate 360° (e.g., every five minutes) so as to achieve a mix of warm and cold air in all directions around the wind machine 100.

In order to drive the fan of the wind machine 100 when operating in the wind generating mode 102, the wind machine 100 is provided an engine or motor 110. The engine 110 may be a diesel, a gas or propane engine, or an electrical motor, and drives a fan shaft within the primary column of the wind machine 100. The fan shaft engages a gearbox within the pivoting head 106 in order to rotate the blades of the fan 108 in a direction so as to drive warm air down and onto the crops.

On the other hand, when operating in the power generating mode 104, it will be noted from FIG. 1 that the pivoting head 106 orients, the blades 108 the fan vertically. Further, the wind machine is provided with a generator 112 that is also coupled (or couplable) to a fan shaft within the primary column of the wind machine 100. The blades 108 of the fan are oriented to face into the wind so that the wind rotates the fan blades 108, in turn causing rotation of the fan shaft which is coupled (directly or indirectly) to the generator 112. In this way, the wind machine 100 may, in the power generating mode, operate as a wind turbine.

To enable the engine 110 to drive the fan shaft when in the wind generating mode 102, and so as to enable the fan shaft to drive the generator 112 when in the power generating mode 104, the hybrid wind machine 100, in an example embodiment, includes a transmission mechanism in the example form of a clutch 114.

Figure 2:
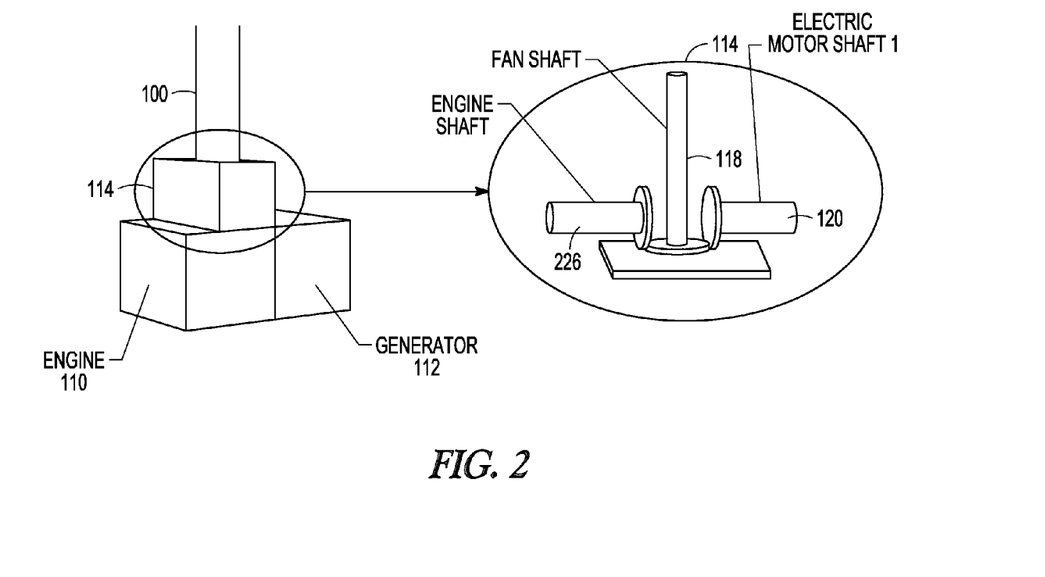
FIG. 2 provides a perspective view of a base, according to an example embodiment, of a dual-mode wind machine having a clutch, engine and generator.

FIG. 2 provides a pictorial representation of the clutch 114 and illustrates how the clutch may be used to selectively engage an engine shaft 116 with a fan shaft 118 when the wind machine 100 is operating in the wind generating mode 102. Further, the clutch 114 may be used to selectively engage the fan shaft 118 with an electric motor shaft 120, when the fan 100 is operating in the power generating mode 104.

It will be appreciated that other transmission mechanisms may be provided to allow the engine 110 to selectively drive the fan shaft, and similarly to allow the fan shaft 118 to selectively drive an electrical generator/motor. For example, in one embodiment (not shown), a generator (e.g., the generator 418) and an engine (e.g., the engine 420) may be mounted on sliders affixed to a base of the machine 100 to allow these components to be slid in and out of engagement with a gear of the fan shaft 118, depending on wind/weather conditions. In another embodiment, the fan shaft may be a slidable in a vertical direction to engage with either an engine shaft or a generator shaft. The engine and a generator shafts may be positioned, on a base of the wind machine 100, at different heights. Accordingly, in a first vertical position, the fan shaft may engage at a lower end with an engine shaft of the engine 420 and at a top end with drive transmission arrangement (e.g., set of gears) that drive the blades 412. In a second vertical position, the fan shaft may engage at the lower end with a generator shaft of the generator 418 and at a top end with a driven transmission arrangement (e.g., another set of gears) that enable the blades 412 to drive the fan shaft.

Figure 3:
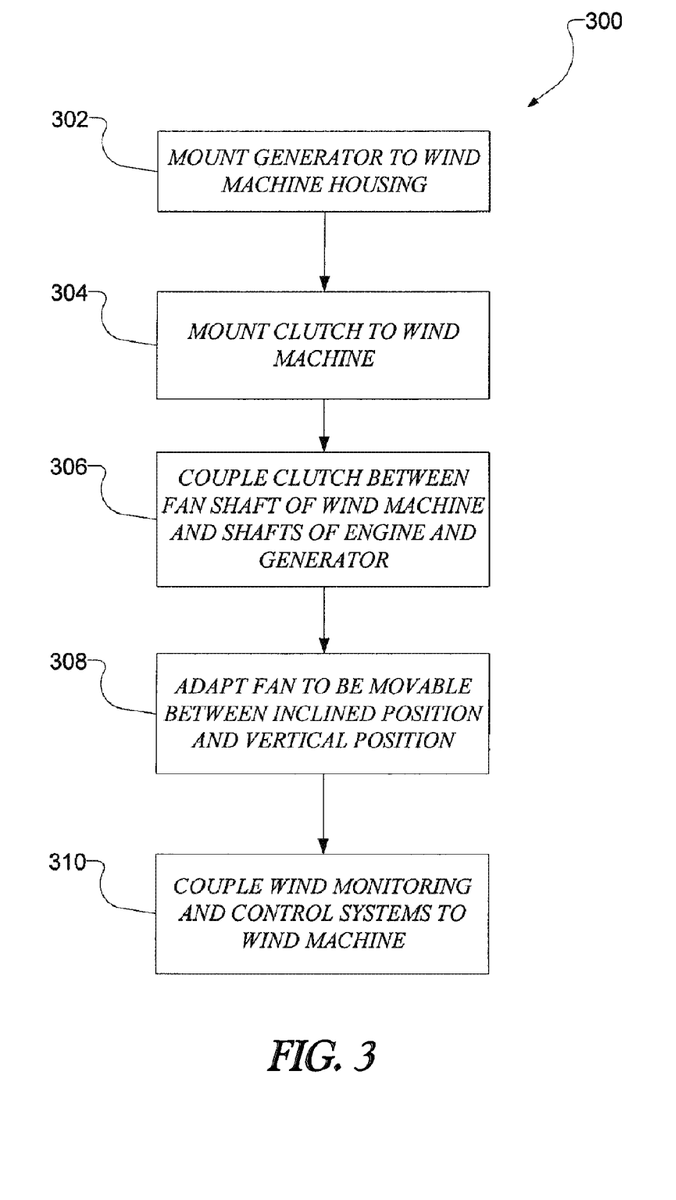
FIG. 3 is a flow chart illustrating a method to, according to an example embodiment, of manufacturing (or retrofitting) a wind machine.

FIG. 3 is a flowchart illustrating a method 300, according to an example embodiment, of retrofitting, or manufacturing, a wind machine in order to create a hybrid wind machine.

The method 300 commences at operation 302, with the mounting of a generator 112 to a housing of a wind machine 100. At operation 304, a transmission mechanism, in the example form of a clutch 114, is also mounted to the wind machine 100. In an example embodiment where the wind machine is being manufactured as a new wind machine, an engine (e.g. diesel, gas or propane) or electrical motor may also be mounted to the wind machine. However, where an existing wind machine is being retrofitted, such a wind machine typically will already have an engine or motor installed thereon.

At operation 306, the clutch is coupled between the fan shaft of the wind machine, and shafts of the engine 110 and the generator 112. The clutch 114 is installed so as to allow the engine 110 to selectively drive the fan shaft, in a wind generating mode, and so as to allow the fan shaft to drive the generator shaft in a power generating mode.

At operation 308, a fan of the wind machine 100 is configured to be movable between an inclined position (in the wind generating mode) and a vertical position (in the power generating mode). It will be appreciated that the inclination of the blades of the fan may be achieved, in various ways. In one embodiment, the entire head 106 of the wind machine may be pivoted. In other embodiments, merely the blades themselves may be inclined or tilted. In yet a further embodiment, the shaft of the wind machine itself may be tiltable so as to provide the inclination of the fan blades relative to a vertical.

At operation 310, a wind monitoring system and a control system are coupled to the wind machine. The wind monitoring system, as will be described in further detail below, may monitor ambient wind conditions relative to the wind machine 100. The wind monitoring system may be coupled to the control system, which may, responsive to input received from the wind monitoring machine, orientate the fan of the wind machine to face into the wind.

Figure 4:
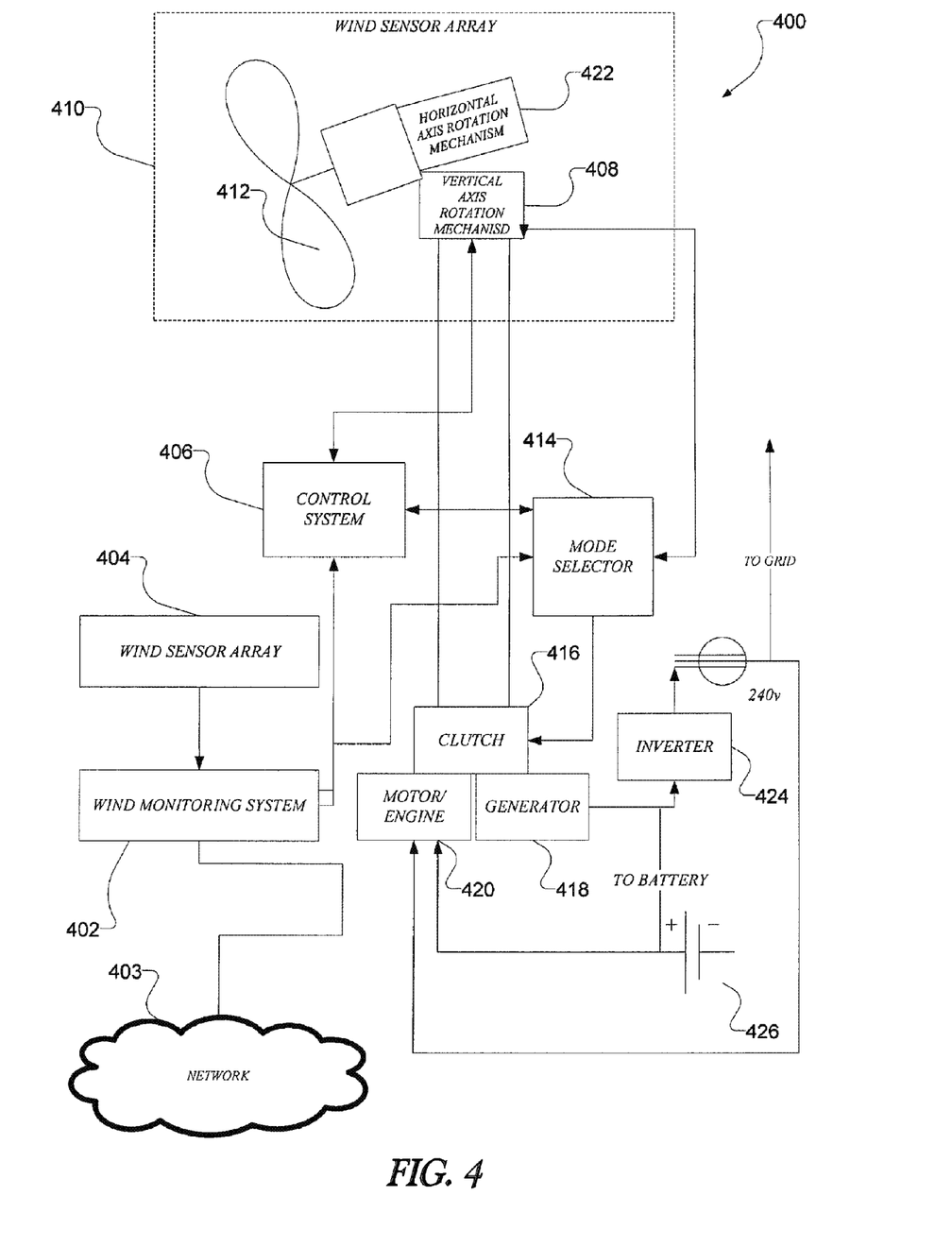
FIG. 4 is a diagrammatic representation of a dual-mode wind machine, according to an example embodiment, coupled to a wind monitoring system and control system to selectively place the wind machine in either a power generating mode or a wind generating mode.

FIG. 4 is a block diagram illustrating further details of a hybrid wind machine 400, according to an example embodiment. The hybrid wind machine 400 is coupled to a wind monitoring system 402, which is coupled to receive input regarding wind direction from an array 404 of wind sensors that may be located proximate to the hybrid wind machine 400. The sensors of the array 404 may, for example, be distributed at various locations, including on top of the wind machine 400, so as to enable the wind monitoring system 404 to accurately monitor ambient wind conditions.

The wind monitoring system 402 is in turn coupled to a control system 406 that controls a vertical axis rotation mechanism 408 of a head 410 of the wind machine. When operating in the power generating mode, the control system 406 controls the vertical rotation mechanism 408 to orient the fan 412 to face into a prevailing wind.

The vertical rotation mechanism 408 can rotate the head 410 360° at controllable speeds. When the hybrid wind machine 400 is operating in the wind generating mode, the control system 406 controls the vertical axis rotation mechanism 408 to periodically rotate the head 410 360° to achieve a mixing of air around the wind machine 400.

As noted above, the head 410 may also include a pitch positioning mechanism, controllable by the control system 406, to vary the pitch of the blades 412, based on detected weather conditions (e.g., information received from the wind monitoring system 402 and operating mode (e.g., information received from the mode selector 414). The pitch of the blades 412 may be varied and optimized for each mode of operation (e.g., for wind speed when the wind machine 400 is operating in a power generating mode).

In addition to orientating the head 410 of the wind machine 400, the wind monitoring system 402 may be coupled to a mode selector 414 which, in one example embodiment, automatically places the hybrid wind machine 400 in a power generating mode when ambient wind conditions are determined to be sufficient to drive the fan 412 of the machine 400. For example, a predetermined threshold wind speed may be detected by the wind monitoring system 402, based on input received from the wind sensor array 404. When the threshold wind speed is detected, the wind monitoring system 402 may transmit a signal to the mode selector 414, which may then place the hybrid wind machine 400 in the power generating mode.

The mode generator 414 is shown to be coupled to a clutch 416 so as to allow the fan shaft to selectively engage with either a generator 418 in the power generating mode, or a motor or engine 420 in the wind generating mode. The clutch 416 may provide a varying gear ratios or drive ratios, to accommodate differences in torque that may be required in the respective wind and power generating modes. For example, a particular drive ratio may be desirable when the engine 420 is driving the fan shaft in the wind generating mode, while a different drive ratio may be desirable when the fan shaft is driving the generator 418 in the power generating mode. Furthermore, in the power generating mode, different gearing or drive ratios may be applied by the clutch 416 in order to compensate for different wind velocities.

Similarly, the mode selector 414 is shown to be coupled to a horizontal axis rotation mechanism 422 that adjusts the tilt or inclination of the blades of the fan 412, according to the mode of operation. The mode selector 414 is also shown to be coupled to the control system 406 so as to allow the control system 406 to operate the vertical axis rotation mechanism 408 in accordance with the appropriate mode.

The generator 418, shown in FIG. 4, is coupled to an inverter 424, and provides DC electricity to the inverter, which then outputs AC electricity to a grid. The generator 418 may also be electrically coupled to a battery 426, which can then store electrical power for use by the hybrid wind machine 400, or for other purposes. To this end, the battery 426 is shown to be coupled to the motor 420 so as to enable powering of the motor 420. The motor 420 is also shown to be coupled to the grid, from which, in one example embodiment, the motor 420 may draw electrical power when operating in the wind generating mode.

In one example embodiment, the wind monitor system 402 may also be coupled to a network 403, in order to provide information concerning wind conditions (e.g., across an entire orchard or vineyard) to a central wind monitoring system. Wind conditions across a field, vineyard or orchard may vary, and the logging of this information may be useful to provide historical information identifying locations where wind conditions are particularly favorable for power generation.

Figure 5:
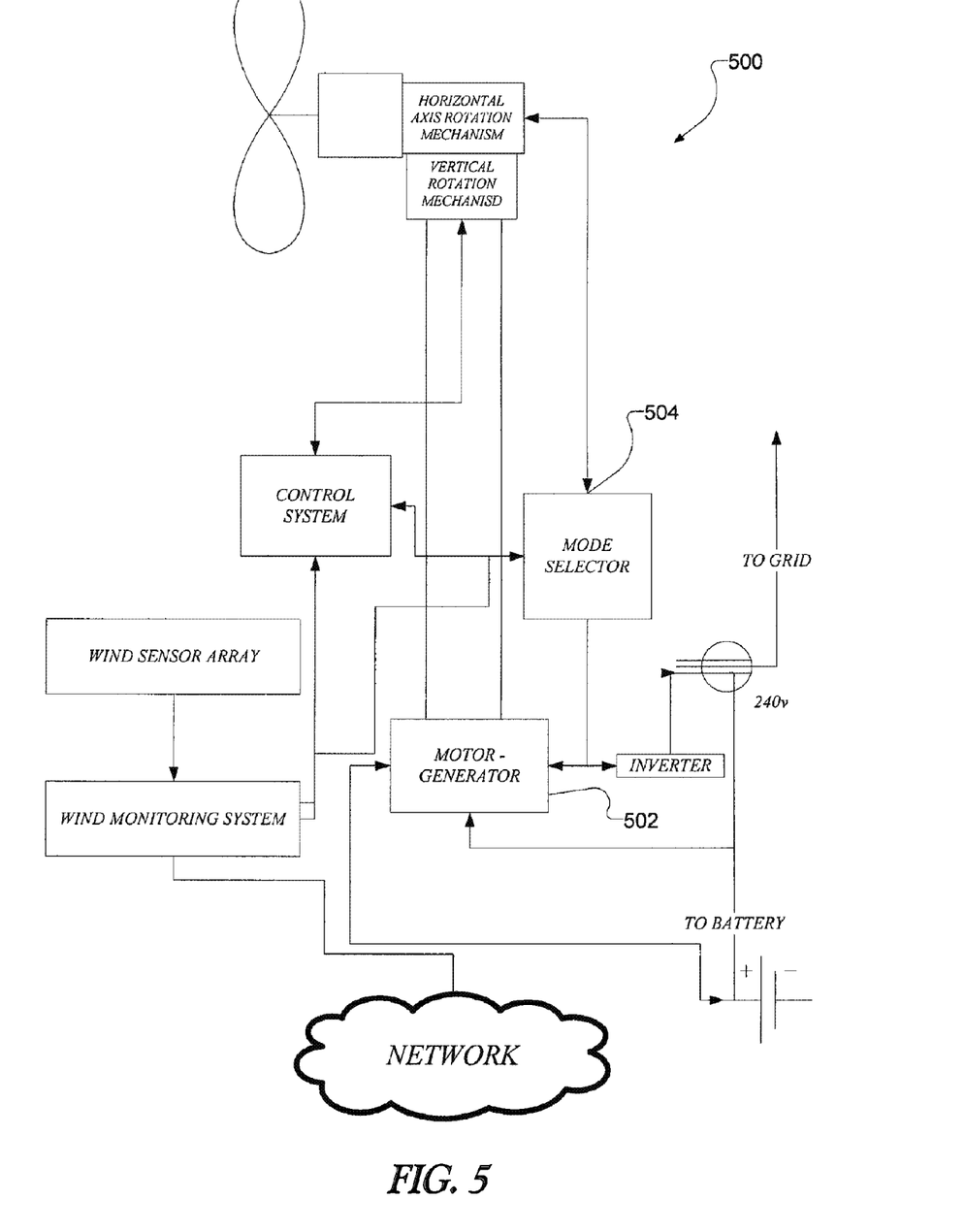
FIG. 5 is a diagrammatic representation of a dual-mode wind machine, according to a further example embodiment, again coupled to a wind monitoring system and the control system, and having a combined motor/generator assembly.

FIG. 5 is a block diagram illustrating a further example embodiment of a hybrid wind machine 500, in the wind machine 500, a combined motor-generator 502 is used, instead of the engine/generator/clutch assembly shown in FIG. 4. It will be appreciated that the combined electrical motor-generator may be used to impart rotation to the fan shaft when the wind machine 500 is operating in the wind generating mode, and may be used to generate electricity, derived from rotation of the fan shaft by the fan, when the wind machine 500 is operating in a power generating mode. The mode selector 504 may, in this embodiment, operate to switch the electrical motor-generator 502 between the motor and generator functions.

While automated example embodiments have been discussed above with reference to FIGS. 4 and 5, manual control and operation of a wind machine may be implemented in other embodiments. For example, a manual selection mechanism may be provided to select a particular mode of operation, and mechanical mechanisms may be provided to configure a wind machine for operation in each of the power generation and wind generation and modes. To this end, the tilt or inclination of the blades of the fan (e.g., by -tilting of the fan head), rotation of the fan head, and pitch of the blades of the fan may all be manually adjustable.

Figure 6:
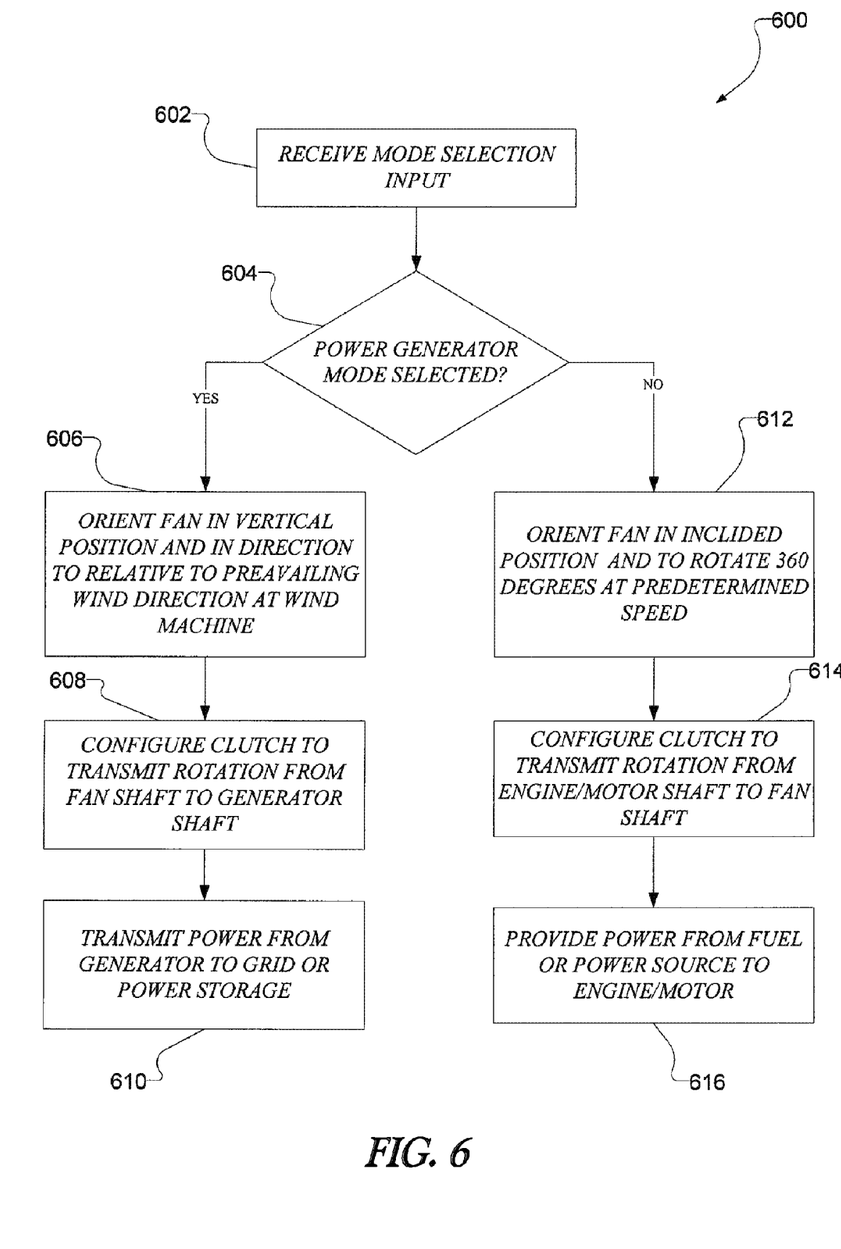
FIG. 6 is a flowchart illustrating a method, according to an example embodiment, of operating a dual-mode wind machine in either a wind generating mode or power generating mode.

FIG. 6 is a flowchart illustrating a method 600, according to an example embodiment, to operate a hybrid wind machine according to an example embodiment. The method 600 commences at operation 602 with the generation, by the mode selector 414, of a mode selection input, which is then received by the clutch 416 (or the motor-generator 502).

At decision block 604, a determination is made whether the power generating mode has been selected. If so, the method 600 proceeds to operation 606, where the horizontal axis rotation mechanism 422 orientates the fan of the hybrid wind machine at a vertical position. The horizontal axis rotation mechanism also orients in a direction facing into a prevailing wind.

Similarly, responsive to a selection of the power generating mode, the clutch 416 is configured at operation 608 to impart rotation from the fan shaft to the generator shaft.

At operation 610, the generator 418 then outputs electricity, via the inverter 424 to the grid, or to a power storage (e.g., the battery 426).

Returning to decision operation 604, if the power generating mode is not determined to be selected, it may be assumed that the wind generating mode has been selected, and the method 600 proceeds to operation 612. At operation 612, the horizontal axis rotation mechanism 422 orientates the fan into an inclined position (e.g., 6° inclination or tilt), and the control system also initiates rotation of the fan head 410 around the vertical axis, using the vertical axis rotation mechanism 408. The fan head 410 may be rotated at a predetermined speed (e.g., so that the fan head completes a 360° revolution every five minutes).

At operation 614, the mode selector also causes the clutch to be configured to transmit rotation from an engine or motor shaft to a fan shaft, thereby causing rotation to the fan 412.

At operation 616, power is provided to the motor or engine 420 from a fuel or power source (e.g., the battery 426).

Figure 7:
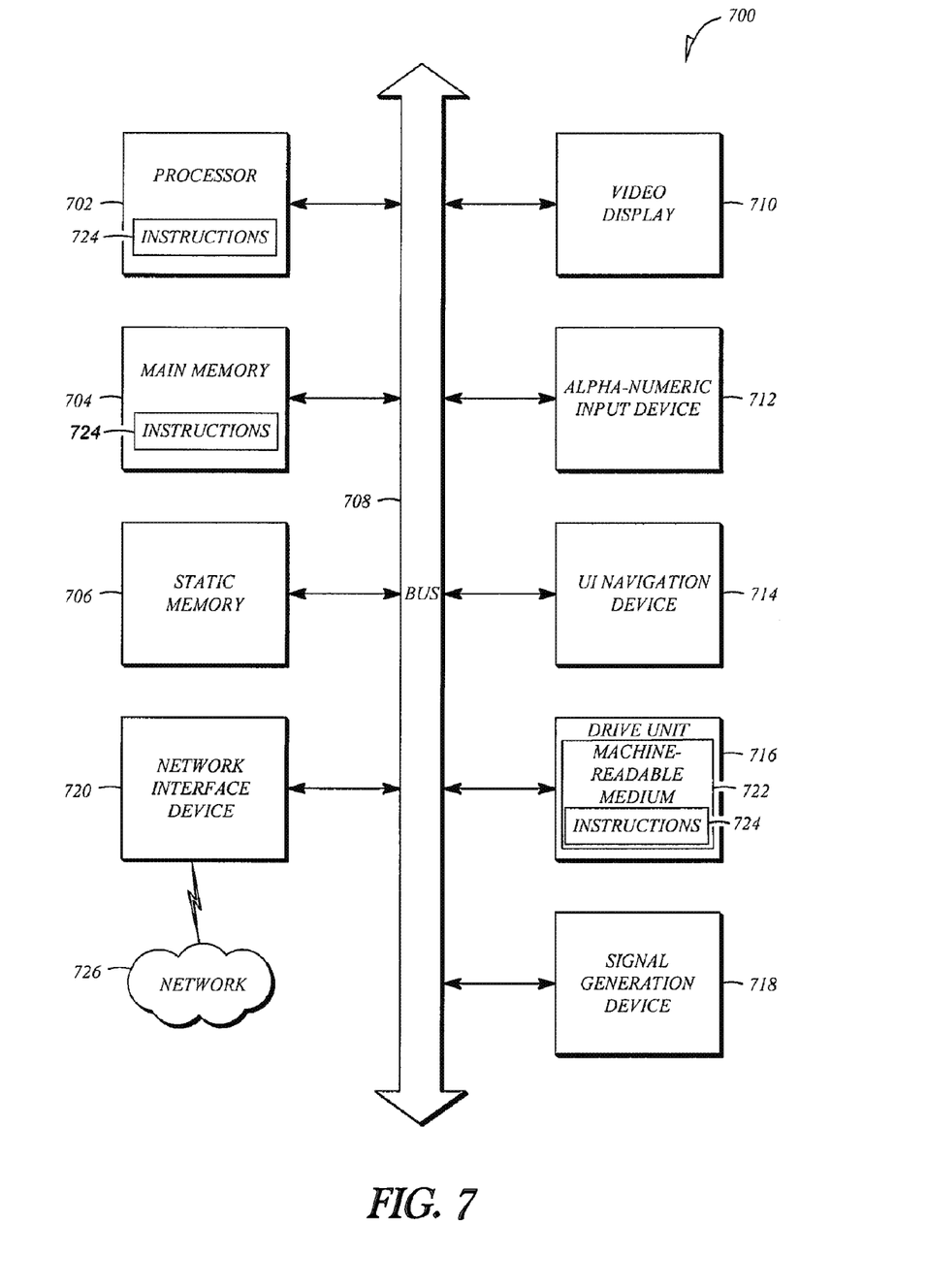
FIG. 7 is a block diagram of a machine, in the exemplary form of a computer system within which a set of instructions, for causing the machine to perform certain methods discussed herein, may be executed.

FIG. 7 is a block diagram of machine in the example form of a computer system 700 within which instructions, for causing the machine to perform any one or more of the methodologies discussed herein, may be executed. For example, the computer system 700 may be used to at least partially implement the above-described wind monitoring system 402, mode selector 414 or control system 406.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Figure 8:
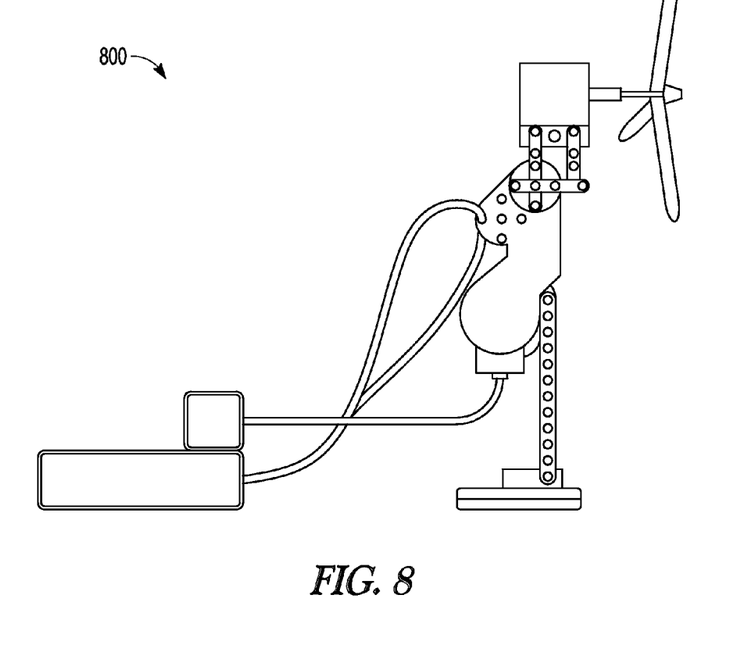
FIGS. 8 and 9 are views illustrating a reduced-scale model of a dual-mode wind machine.
Figure 9:
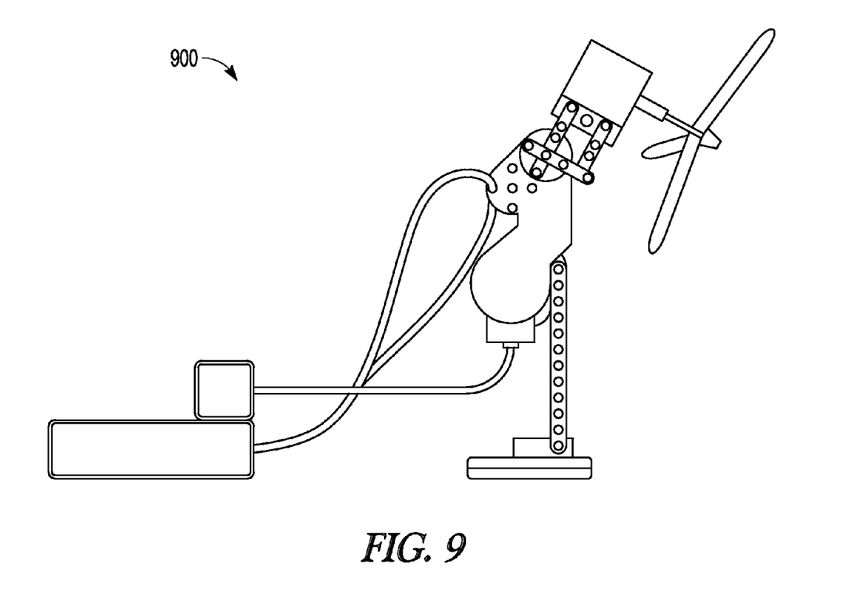

FIGS. 8 and 9 are photographs showing a small-scale model of a hybrid wind machine. Specifically, FIG. 8 shows the model hybrid wind machine in a first, vertical orientation in which it may operate as a wind generator, while FIG. 9 shows the model wind machine in an inclined position, in which it may operate as a wind machine.

The example hybrid wind machine provides a number of economic and environmental advantages. Specifically, as opposed to having a standalone wind machine which only operates a few times a year to counter frost, the described example embodiment may be used at other times of the year to generate electricity. The generated electricity may be stored (e.g., in a battery), or returned to the grid for a credit against electrical usage charges of the grid consumer. Thus, in addition to operating to counter frost damage, the hybrid wind machine may operate as an effective source of income on a farming operation.

Further, the above described method of retrofitting existing wind machines provides the advantage of leveraging existing capital investments in wind machines to generate electricity, and accordingly income for a farming operation. The costs of retrofitting an existing wind machine may be substantially less than manufacturing a new hybrid wind machine.

Modules, Components and Logic

Certain embodiments are described herein as including logic or a number of components, modules, or mechanisms. A component is tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component may be implemented mechanically or electronically. For example, a component may comprise dedicated circuitry or logic that is permanently configured (e.g., as a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiple of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, one component may perform an operation, and store the output of that operation in a memory device to which it is communicatively coupled. A further component may then, at a later time, access the memory device to retrieve and process the stored output. Components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of operating a wind machine, the method comprising:
   engaging a drive transmission between a first shaft of the wind machine and a second shaft for an electrical generator so as to allow the first shaft to selectively drive the second shaft when the wind machine is operating in a power generation mode;
   engaging the second shaft to drive the electrical generator;
   adapting a fan blade head of the wind machine to be movable between a first position in which the blades of the wind machine are inclined at a controllable angle, and a second position in which the blades of the wind machine are substantially vertical; and
   providing the wind machine with
      a mode selector for placing the machine in the power generation mode or a wind generation mode in response to a detection of ambient wind conditions;
      a horizontal axis rotation mechanism that adjusts the tilt or inclination of the blades of the fan according to the selected mode of operation; and
      a vertical axis rotation mechanism including an automatic control system for rotating the fan blade head at a selectively controllable speed, and at a selectively controllable periodic interval, about a vertical axis independently of the fan speed when the machine is in the wind generation mode;
   the method farther comprising:
      rotating the fan blade head at a selected speed and periodic interval about the vertical axis when the machine is in the wind generation mode.

2. The method of claim 1, including mounting the electrical generator to the wind machine.

3. The method of claim 1, wherein the adapting of the fan blade head includes replacing a gearbox of the fan blade head with a contouring head.

4. The method of claim 1, including coupling a wind monitoring and control system to the wind machine, the wind monitoring and control system to operationally orientate the fan blade head in a direction to induce wind-driven blade rotation when the wind machine is operating in the power generation mode.

5. The method of claim 1, wherein the drive transmission is a clutch coupled between the first shaft of the wind machine and a third shaft of an engine is so as to allow the third shaft to selectively drive the first shaft of the wind machine when the wind machine is operating in the wind generation mode.

6. A method of manufacturing a wind machine, the method comprising:
   engaging a first shaft, to drive a fan of a wind machine, to an electrical motor-generator so as to allow the electrical motor-generator to drive the first shaft when the wind machine is operating in a wind generation mode, and so as to allow the first shaft to drive the electrical motor-generator as an electrical generator when the wind machine is operating in a power generation mode, and
   configuring a fan blade head of the wind machine to be movable between a first position in which the blades of the wind machine are inclined at a controllable angle, and a second position in which the blades of the wind machine are substantially vertical; and
   providing the wind machine with
      a mode selector for placing the machine in the power generation mode or a wind generation mode in response to a detection of ambient wind conditions;
      a horizontal axis rotation mechanism that adjusts the tilt or inclination of the blades of the fan according to the selected mode of operation; and
      a vertical axis rotation mechanism including an automatic control system for rotating the fan blade head at a selectively controllable speed, and at a selectively controllable periodic interval, about a vertical axis independently of the fan speed when the machine is in the wind generation mode.

7. A method of manufacturing a hybrid wind machine, the method comprising:
   providing a first shaft of a wind machine to drive a fan of the wind machine;
   providing a second shaft to be driven by an engine;
   providing a third shaft to drive an electrical generator;
   engaging a drive transmission between the first, second and third shafts so as to allow the second shaft to drive the first shaft when the hybrid wind machine is operating in a wind generation mode, and so as to allow the first shaft to drive the third shaft when the hybrid wind machine is operating in a power generation mode, and
   configuring a fan blade head of the hybrid wind machine to be movable between a first position in which the blades of the hybrid wind machine are inclined at a controllable angle, and a second position in which the blades of the hybrid wind machine are substantially vertical; and
   providing the hybrid wind machine with
      a mode selector for placing the wind machine in the power generation mode or the wind generation mode in response to a detection of ambient wind conditions;

a horizontal axis rotation mechanism that adjusts the tilt or inclination of the blades of the fan according to the selected mode of operation; and a vertical axis rotation mechanism including an automatic control system for rotating the fan blade head at a selectively controllable speed, and at a selectively controllable periodic interval, about a vertical axis independently of the fan speed when the machine is in the wind generator mode.

8. The method of claim 7, wherein providing the hybrid wind machine with a mode selector includes coupling the mode selector to the drive transmission so as to allow the operator to selectively engage the first and second shafts when the hybrid wind machine is operating in the wind generation mode, and to selectively engage the first and third shafts when the hybrid wind machine is operating in the power generation mode.

9. The method of claim 7, including coupling a wind monitoring system to the hybrid wind machine to selectively place the hybrid wind machine in the power generation mode based on the wind monitoring system detecting predetermined wind conditions relative to the hybrid wind machine.

10. The method of claim 9, including coupling a control system to the wind monitoring system and the hybrid wind machine, the control system to receive wind direction input from the wind monitoring system to orientate the fan of the wind machine based on the wind direction input.

* * * * *